United States Patent
Hu et al.

(10) Patent No.: US 10,380,272 B2
(45) Date of Patent: Aug. 13, 2019

(54) UPDATE COMPUTER-IMPLEMENTED METHOD, COMPUTER PROGRAM PRODUCT AND COMPUTER SYSTEM FOR GENERATING OR UPDATING TOPOLOGY MODEL OF PRESSURE PIPE NETWORK

(71) Applicant: International Business Machines Corporation, Armonk, NY (US)

(72) Inventors: Yong Deng Hu, Beijing (CN); Eoin Lane, Littleton, MA (US); Xiao Lv, Beijing (CN); Jian Wang, Beijing (CN); Ke Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 14/700,724

(22) Filed: Apr. 30, 2015

(65) Prior Publication Data

US 2016/0321379 A1 Nov. 3, 2016

(51) Int. Cl.
G06F 17/50 (2006.01)
G01M 3/28 (2006.01)
G01F 1/00 (2006.01)
H04L 12/24 (2006.01)
H04L 29/08 (2006.01)

(52) U.S. Cl.
CPC ............ *G06F 17/5004* (2013.01); *G01F 1/00* (2013.01); *G01M 3/2807* (2013.01); *G06F 17/50* (2013.01); *H04L 41/12* (2013.01); *H04L 67/12* (2013.01); *G06F 17/509* (2013.01); *G06F 17/5095* (2013.01); *G06F 2217/34* (2013.01)

(58) Field of Classification Search
CPC ..... G06F 17/5004; G01M 3/2807; G01F 1/00
See application file for complete search history.

(56) References Cited

U.S. PATENT DOCUMENTS 4,888,706 A * 12/1989 Rush ..................... G01F 1/00
137/624.11
6,829,566 B2 12/2004 Sage
(Continued)

FOREIGN PATENT DOCUMENTS

CN 101685465 A 3/2010
CN 102542081 B 1/2014

OTHER PUBLICATIONS

Quevedo, J., Puig, V., Cembrano, G., Blanch, J., Aguilar, J., Saporta, D., Benito, G., Hedo, M. and Molina, A., "Validation and reconstruction of flow meter data in the Barcelona water distribution network," Control Engineering Practice (Jun. 2010), vol. 11, pp. 640-651. (Year: 2010).*
(Continued)

*Primary Examiner* — Michael Jung
(74) *Attorney, Agent, or Firm* — Isaac J. Gooshaw

(57) ABSTRACT

A computer-implemented method, computer program product and computing system for management of a pressure pipe network is provided. A processor retrieves a topology model of a pipe network. The processor retrieves one or more measurement expressions of the pressure pipe network. The processor determines a parameter list for a first measurement expression, wherein a first parameter of the parameter list represents a cutting point measurement device. The processor generates a first subsystem of the pipe network based, at least in part on, the first parameter.

12 Claims, 8 Drawing Sheets

(56) References Cited

U.S. PATENT DOCUMENTS

| | | | |
|---|---|---|---|
| 7,054,799 B1* | 5/2006 | Hartell | G06F 17/5009 703/2 |
| 7,593,839 B1* | 9/2009 | Wu | G06F 17/5004 703/2 |
| 7,920,983 B1 | 4/2011 | Peleg et al. | |
| 8,265,911 B1* | 9/2012 | Wu | E03B 1/00 703/6 |
| 8,583,386 B2 | 11/2013 | Armon et al. | |
| 8,823,509 B2* | 9/2014 | Hyland | H04Q 9/00 340/539.1 |
| 2003/0033117 A1* | 2/2003 | Sage | G06F 17/5004 702/182 |
| 2004/0093172 A1* | 5/2004 | Mizushina | G01M 3/2807 702/50 |
| 2004/0148113 A1* | 7/2004 | Sage | F17D 5/02 702/51 |
| 2005/0216242 A1* | 9/2005 | Flax | A62C 35/62 703/9 |
| 2011/0190947 A1* | 8/2011 | Savelle, Jr. | G05D 11/02 700/284 |
| 2012/0197552 A1* | 8/2012 | Robinson | G01D 4/002 702/50 |
| 2013/0211797 A1 | 8/2013 | Scolnicov et al. | |
| 2014/0163916 A1* | 6/2014 | Ba | G06Q 10/04 702/100 |
| 2016/0323149 A1 | 11/2016 | Hu et al. | |

OTHER PUBLICATIONS

Puust, R., Kapelan, Z., Savic, D. A., & Koppel, T. "A review of methods for leakage management in pipe networks." (2010), Urban Water Journal, 7(1), 25-45. (Year: 2010).*

Diao et al., "Automated Creation of District Metered Area Boundaries in Water Distribution Systems", Journal of Water Resources Planning and Management, vol. 139, No. 2, Mar./Apr. 2013, pp. 184-190, (doi: http://dx.doi.org/10.1061/(ASCE)WR.1943-5452.0000247), <http://cedb.asce.org/cgi/WWWdisplay.cgi?301510>.

Di Nardo et al., "A Design Support Methodology for District Metering of Water Supply Networks", Water Distribution Systems Analysis 2010: pp. 870-887, doi: 10.1061/41203(425)80, <http://ascelibrary.org/doi/abs/10.1061/41203(425)80>.

IBM, "Solution overview", provided in search results dated Aug. 1, 2014, 2 pages, <http://www-01.ibm.com/support/knowledgecenter/api/content/nl/en-us/SS7QZZ_1.5.1/water/ov_intro151.dita>.

Izquierdo et al., "Division of Water Supply Systems into District Metered Areas Using a Multi-agent Based Approach", J. Cordeiro, A. Ranchordas, and B. Shishkov (Eds.): ICSOFT 2009, CCIS 50, pp. 167-180, 2011. © Springer-Verlag Berlin Heidelberg 2011.

Scibetta et al., "Community detection as a tool for district metered areas identification", 12th International Conference on Computing and Control for the Water Industry, CCWI2013, Procedia Engineering 70 (2014), 1518-1523, Elsevier, Available online at www.sciencedirect.com.

IBM Appendix P, "List of IBM Patents and Patent Applications Treated as Related", dated Sep. 15, 2017, 2 pages.

* cited by examiner ously transmitted through the fiber-optic cable), or electrical signals transmitted through a wire.

UPDATE COMPUTER-IMPLEMENTED METHOD, COMPUTER PROGRAM PRODUCT AND COMPUTER SYSTEM FOR GENERATING OR UPDATING TOPOLOGY MODEL OF PRESSURE PIPE NETWORK

BACKGROUND OF THE INVENTION

The present invention relates generally to the field of pipe networks and, more particularly, to management of a pipe network.

A pressure pipe network is a network system that consists of a number of interconnected pipes through which fluid flows. Examples of pipe networks include, but not limited to, water distribution networks, oil transportation systems and gas transportation systems. Usually, aside from the pipes, a pressure pipe network also comprises a set of other facilities that control the flow of the fluid, monitor and collect data, and make measurements of specific properties of the network. For example, a water distribution network is composed of a set of interconnected water treatment works, mains, customer connections and hydrants, with flow meters deployed on water mains to measure volumes of water that flows into a main and water usage meters to customer connections to measure water usage for a particular customer account.

SUMMARY

Embodiments of the present disclosure provide a computer-implemented method, system and computing system. A processor retrieves a topology model of a pipe network. The processor retrieves one or more measurement expressions of the pressure pipe network. The processor determines a parameter list for a first measurement expression, wherein a first parameter of the parameter list represents a cutting point measurement device. The processor generates a first subsystem of the pipe network based, at least in part on, the first parameter.

DETAILED DESCRIPTION

Figure 1:
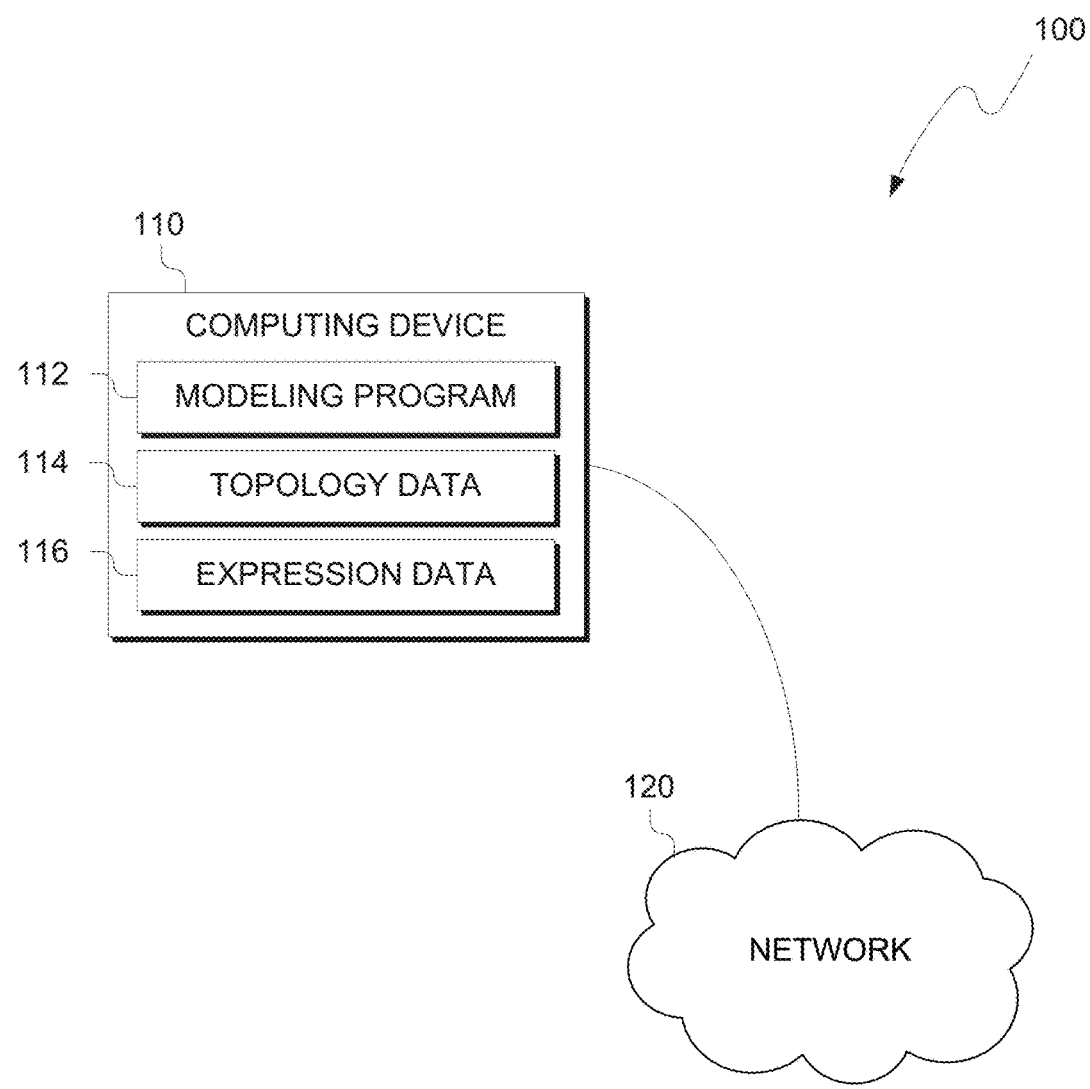
FIG. 1 is a functional block diagram illustrating a networked environment, in accordance with an exemplary embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes computing device 110 connected over network 120. Computing device 110 includes modeling program 112, topology data 114, and expression data 116.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to topology data 114, and expression data 116 and is capable of executing modeling program 112. Computing device 110 may include internal and external hardware components, as depicted and described in further detail with respect to FIG. 6.

In this exemplary embodiment, modeling program 112, topology data 114, and expression data 116 are stored on computing device 110. However, in other embodiments, modeling program 112, topology data 114, and expression data 116 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 110 and other devices (not shown) connected to network 120, in accordance with a desired embodiment of the present invention.

In various embodiments, modeling program 112 retrieves topology data 114 from computing device 110. Topology data 114 includes a model of pipes and connections in a pipe system. As discussed herein, the invention will be described with water distribution network as an example pipe system, however, it should be understood that the invention can be applied to any other kind of pressure pipe network, such as a natural gas distribution network. The model for a pipe system includes, but is not limited to, the location of a pipe that a resource travels, or flows, within the pipe system; a direction the flow of a resource travels with a pipe or pathway at a given time; an amount of resource that flows through a pipe at a given time; and a capacity a pipe can handle of the resource. In addition to the description of pipes of the network, the model includes one or more connection between pipes in the network. For example, a connection includes a location where one or more pipes intersect and are connected. In some embodiments, topology data 114 includes a description and location of one or more other components of the pipe system. For example, a model for a water pipe system includes the location and capacity of a water reservoir.

In various embodiments, topology data 114 includes the location of measurement devices, in addition to data collected by the measurement devices. For example, a location of a flow meter in a water pipe system is included in the model. Additionally, the model includes an amount of flow monitored by the flow meter for various different points in time (e.g., an amount of flow for a month for the last six months). In various embodiments, topology data 114 includes a model for a pipe system that is divided into multiple zones, or subsystems. In some instances a subsystems may be a district metered area (DMA), which are discrete areas of a water distribution network. For a given subsystem, resources flowing into and out of the subsystem are captured by measurement devices along the boundaries of the subsystem. In some embodiments, a measurement device is located at the boundary of one subsystem and another. In such embodiments, the measurement device is referred to as a cutting point device. In various embodiments, a subsystem may include an area such as a town or village, a neighborhood, a building or certain floors of the building.

In various embodiments, modeling program 112 retrieves expression data 116 from computing device 110. Expression data 116 includes one or more measurement expressions describing a pipe system. A measurement expression includes variables for one or more measurement devices. For example, a "system input volume" (SIV) is a measurement expression for one or more subsystems. The SIV is defined as the sum of all measurements of flow meters deployed as input measurement devices of a subsystem. Then a sum of all measurements of output mains of the subsystem are subtracted from the flow monitored by all input device. As such, SIV can be expressed as:

$$\text{System Input Volume}(SIV) = \sum_{n=1}^{i} I_n - \sum_{m=1}^{j} O_m$$

In the above equation, $I_n$ represent the measurements of flow meters ($I_1$ to $I_i$) of inputs to a pipe system. $O_m$ represent the measurements of flow meters ($O_1$ to $O_j$) of outputs from the pipe system (e.g., outbound connections to other subsystems and usage meters).

Using the above expression, a measurement expression for water leakage of a subsystem is defined as SIV minus the water usage of usage meters for end customers of the subsystem. As such, leakage for a subsystem can be expressed as:

$$\text{Leakage} = SIV - \sum_{l=1}^{k} U_l$$

In the above equation, SIV is the system input volume calculated above. $U_1$ represent the measurements of flow meters ($U_1$ to $U_k$) of meters for the end customers located within the subsystem.

It should be understood by the skilled in the art that the above-described measurement expressions are only for the purpose of illustration, other kinds of measurement expressions can also be used without departing from the spirit of the present disclosure.

When changes to a pipe system or a subsystem are made to (e.g., adding a new pipe together with a measurement device or removing a pipe), modeling program 112 updates the change to topology data 114. Such changes may impact the measurement expressions stored in expression data 116. Previous solutions perform manual updates manually to measurement expressions and the variables to reflect such changes. Embodiments of the present invention recognize that by automatically changing and updating the measurement expressions in expression data provides a fast and more accurate update than previous solutions.

Figure 2:
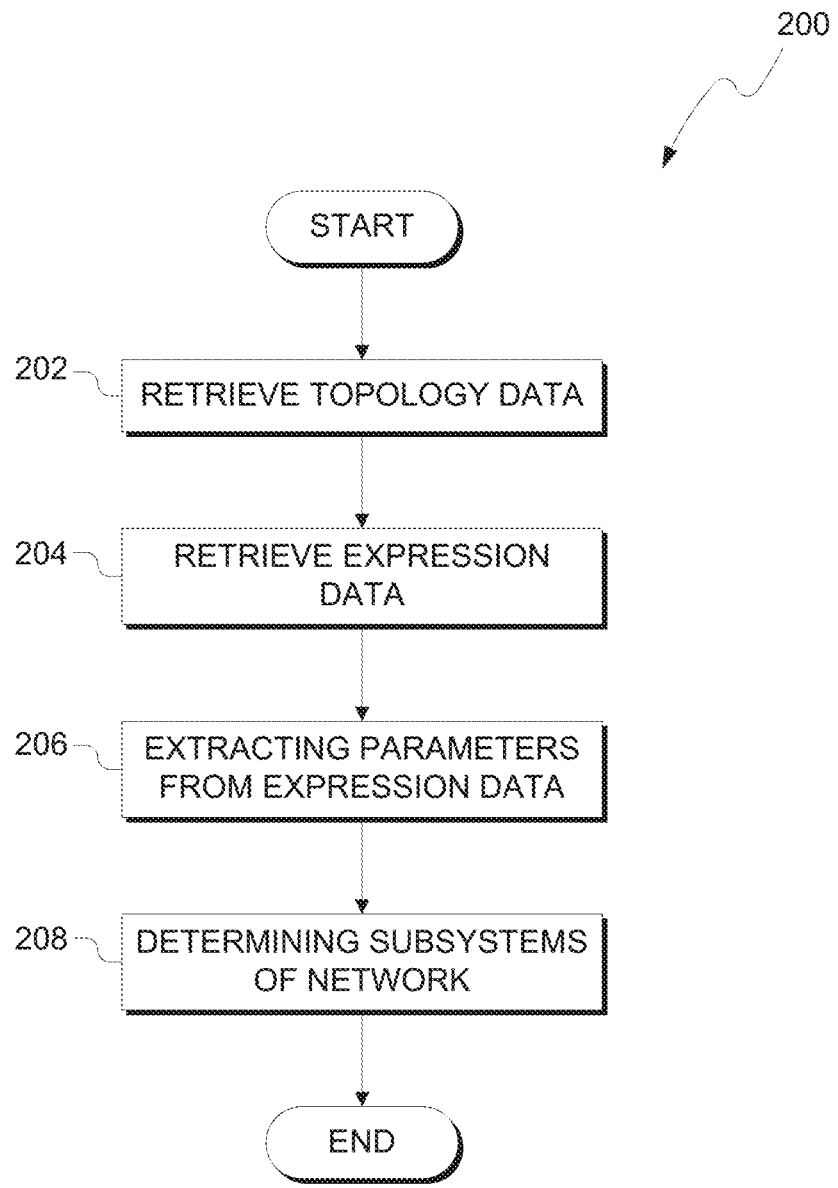
FIG. 2 illustrates operational processes of a modeling program determining one or more subsystems of a pipe system, on a computing device within the environment of FIG. 1, in accordance with an exemplary embodiment of the present invention.

The method of determining one or more subsystems of a pipe system, according to an embodiment of the present disclosure, will be described in detail with reference to FIG. 2. FIG. 2 is a flow diagram depicting a method 200 in accordance with an embodiment of the present disclosure.

Figure 4A:
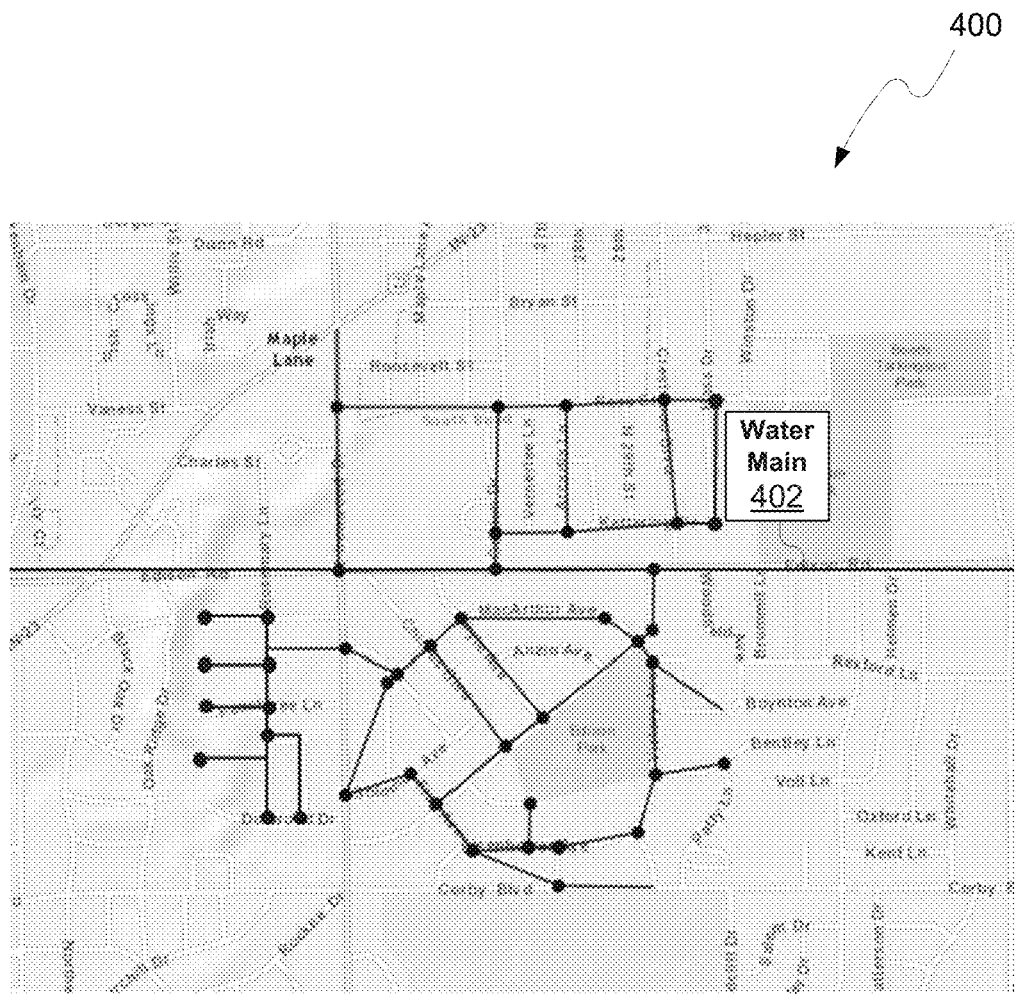
FIG. 4A-4C illustrate example diagrams of a pipe system according to an embodiment of the present disclosure.
Figure 4B:
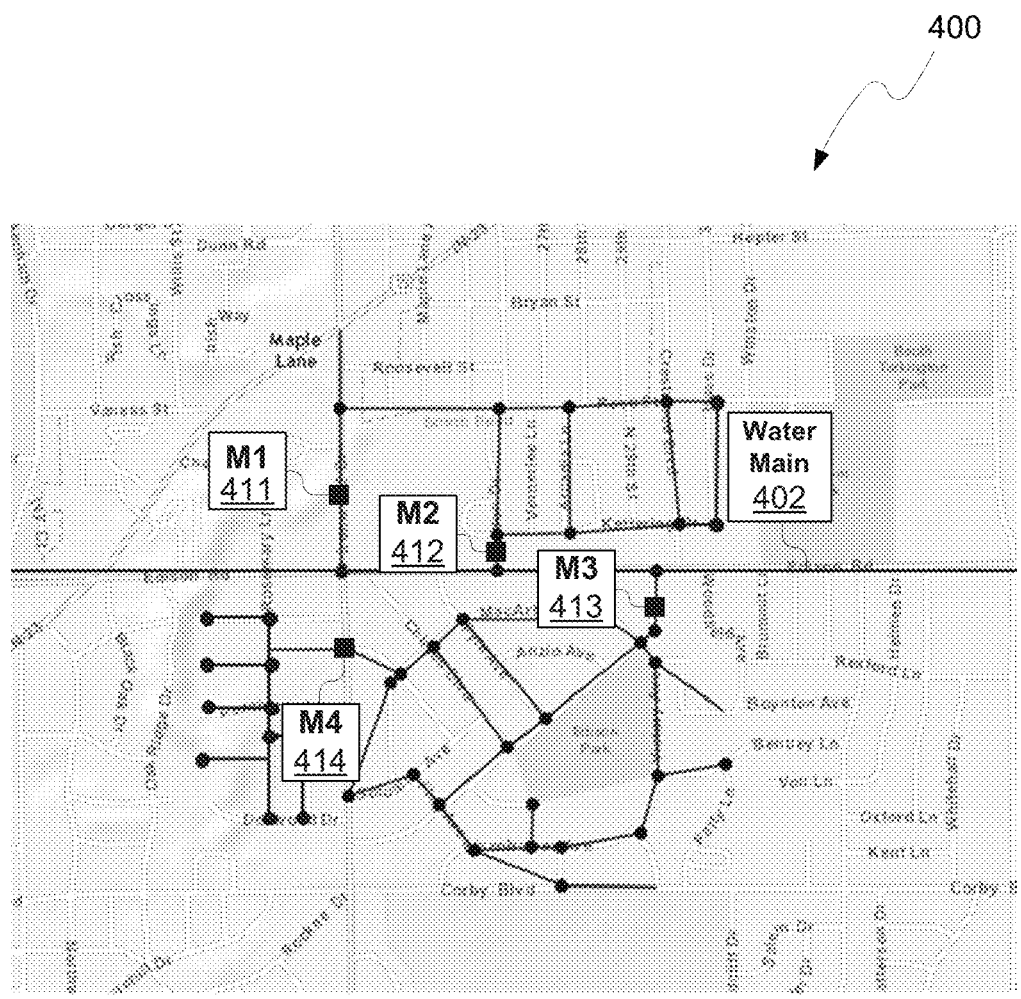
Figure 4C:
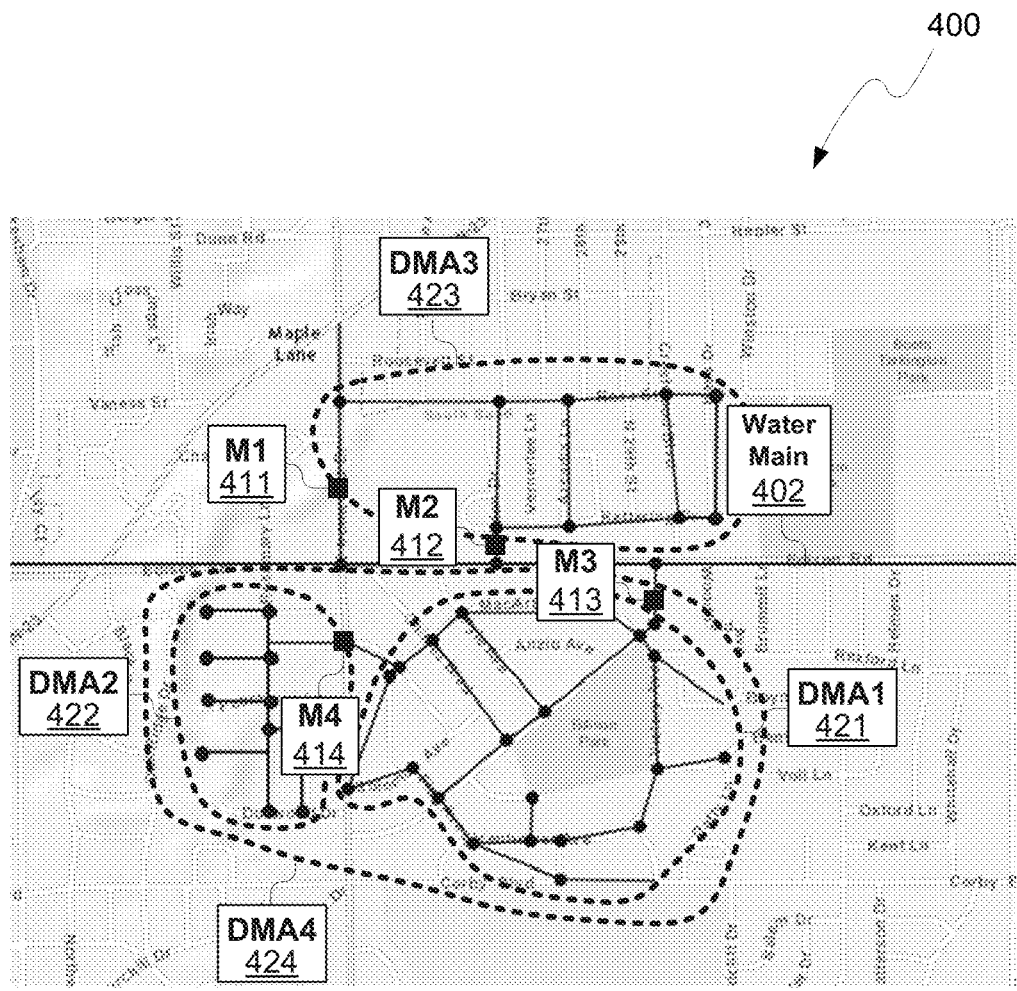

At process 202, modeling program 112 retrieves topology data 114 describing a a pressure pipe network. The topology data 114 includes a model description which describes the layout and metrics of the pipe network. In some embodiments, topology data 114 may be retrieved from Enterprise Assets Management (EAM) system (not shown) or a Supervisory Control and Data Acquisition (SCADA) system (not shown). The description may be in a markup language format (e.g., an XML (eXtensive Markup Language)) file that describes the pipe network. In various embodiments, modeling program 112 generates a pipe network diagram based on the topology data 114. FIG. 4A-C shows an example of a simplified water distribution network diagram. In some embodiments, modeling program 112 retrieves topology data 114 periodically in order to use the most updated information.

At process 204, modeling program 112 retrieves one or more measurement expressions stored in expression data 116. Examples of measurement expressions include but are not limited to system input volume and leakage. At process 206, modeling program 112 extracts a parameter list for each measurement expression. Parameters includes measurements and other descriptors of the pipe system (e.g., the amount of flow of a resource at a given location in the pipe system). In some embodiments, a measurement expression includes variable for a measurement or collection of measurements indicating measurements of boundary sensors of a subsystem (e.g., incoming and outgoing flow of a resource into and out of the subsystem). In other embodiments, a measurement expression includes variable indicating measurements of other sensors (e.g., measurements of end customer meters), which typically are not boundary sensors. In some embodiments, at least part of one of the parameters in each list represent the boundary sensors. In such embodiments, modeling program 112 combines the input boundary measurement device of one subsystem with the output boundary measurement device of another subsystem, which will be referred to herein as cutting point measuring devices. Modeling program 112 determines the location of the cutting point measuring device and selects the location to serve as graphical boundaries of different subsystems. Similarly, user meters will be referred to herein as ending point metering equipments as they will serve as ending points inside a subsystem.

For example, for the measurement expression of leakage is expanded to include expressions for other variables (i.e., SVI) resulting in the following expression:

$$\text{Leakage} = \sum_{n=1}^{i} I_n - \sum_{m=1}^{j} O_m - \sum_{l=1}^{k} U_l$$

Using the above expanded equation, modeling program 112 creates an extracted parameter list for the measurement expression of leakage as the following:

List (Leakage)={$(I_1, I_2, \ldots I_i)$-$(O_1, O_2, \ldots O_j)$-$(U_1, U_2, \ldots U_1)$}

In the above list, $I_1, I_2, \ldots I_i$ represent flow meters deployed on input mains. $O_1, O_2, \ldots O_j$ represent flow meters deployed on output mains. $U_1, U_2, \ldots U_1$ represent water usage meters. In the extracted parameter list, $I_1, I_2, \ldots I_i$ and $O_1, O_2, \ldots O_j$ represent cutting point metering equipments, and $U_1, U_2, \ldots U_1$ represent ending point metering equipments. In the following description, modeling program 112 combined the input mains and output mains of connected subsystems to create, $M_1, M_2, \ldots, M_1$ which represent cutting point metering equipments (i.e., $I_1, I_2, \ldots I_i$ that connect to a respective and $O_1, O_2, \ldots O_j$).

Referring to FIG. 4A as an example, suppose the parameter lists extracted from system input volume measurement expression are as follows:

List (System Input Volume 1)=$\{M_3, M_4\}$

List (System Input Volume 2)=$\{M_4\}$

List (System Input Volume 3)=$\{M_1, M_2\}$

List (System Input Volume 4)=$\{M_3\}$

FIG. 4B shows the cutting point metering equipments $M_1$ 411, $M_2$ 412, $M_3$ 413 and $M_4$ 414 in the above extracted parameter lists. In FIG. 4B, only cutting point metering equipments are shown for the purpose of simplification. The ending point (e.g., customer usage meters) measurement devices are not shown.

At process 208, modeling program 112 determines the subsystems of the pipe network. Modeling program 112 determines the boundaries of one or more subsystems based on the extracted parameters of expression data 116 determined to by representation of a boundary measurement device. (e.g., $M_1, M_2, \ldots, M_l$). Based on the location of the boundary measurement device of corresponding pair of matching input main and output main, modeling program 112 generates a graphical boundary of each subsystem. According to the embodiment of the present disclosure, modeling program 112 constructs boundaries of a subsystem with the location of a cutting point measurement devices serving as a graphical boundary of the subsystem.

FIG. 4C shows the constructed subsystems, and corresponding boundaries, generated by modeling program 112 determined in process 208. For example, cutting point measurement devices $M_1$ and $M_2$ are extracted from expression data 116. Modeling program 112 retrieves the locations of $M_1$ and $M_2$ from topology data 114. The locations of cutting points $M_1$ and $M_2$ are determined to be the graphical boundary of DMA3 423. The location of input main water main 402 and cutting point $M_3$ 413 serve as the graphical boundary of DMA4 424. Furthermore DMA4 424 includes additional subsystems DMA2 422 and DMA1 421. The location of cutting point metering equipment $M_4$ 414 serve as the graphical boundary of DMA2 422. The location of cutting point metering equipment $M_4$ 414 and $M_3$ 413 serve as the graphical boundary of DMA1 421. The extent of the coverage of a given subsystem is further based on the location of end customer measurement devices and the corresponding locations of said end customer measurement devices.

Figure 3:
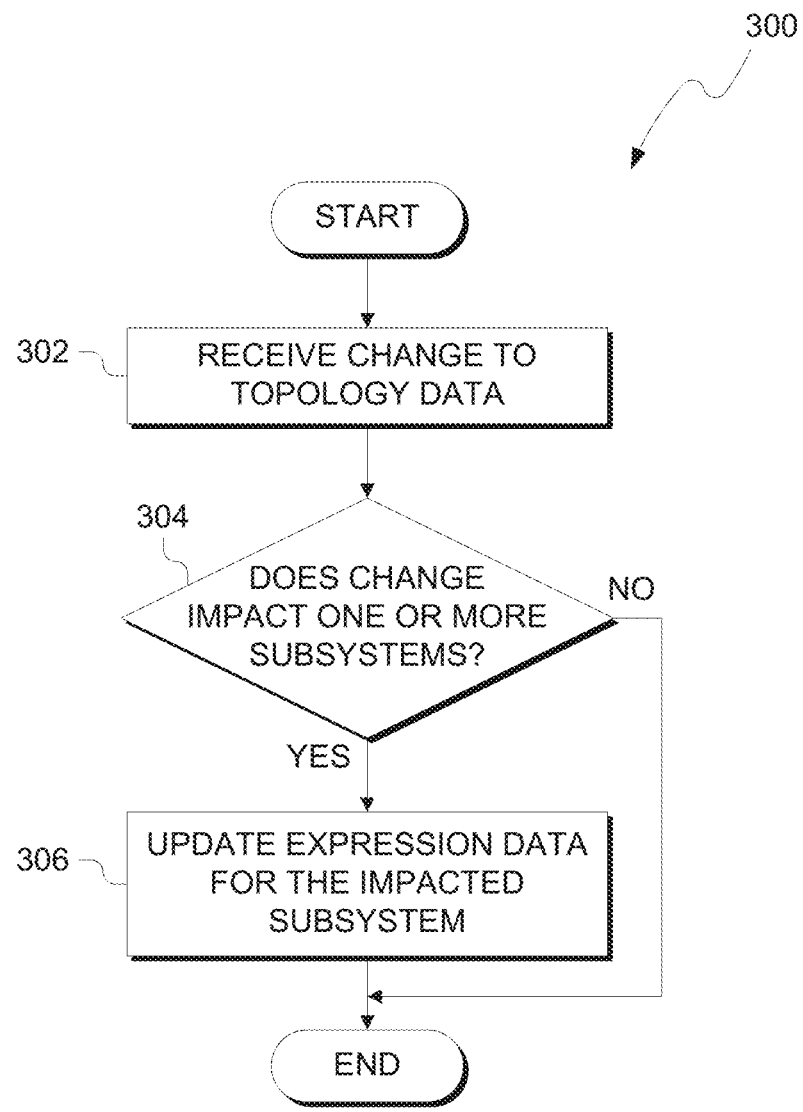
FIG. 3 illustrates operational processes of a modeling program updating an expression for one or more subsystems in response to a change to a pipe system, on a computing device within the environment of FIG. 1, in accordance with an exemplary embodiment of the present invention.

The method of updating an expression for one or more subsystems in response to a change to a pipe system, according to an embodiment of the present disclosure, will be described in detail with reference to FIG. 3. FIG. 3 is a flow diagram depicting a method 300 in accordance with an embodiment of the present disclosure.

In some embodiments, modeling program 112 receives an update to topology data 114 in response to a change being made to the pipe network (process 302). In response to the change to topology data being detected, modeling program 112 determines if the changes will impact one or more subsystems (process 304). If the change does not impact any subsystems or the respective measurement expressions associated with the subsystem (NO branch of process 304), then modeling program 112 keeps the current expression data 116. If the change impacts one or more subsystems or the respective measurement expressions associated with the impacted subsystem (YES branch of process 304), then modeling program 112 updates the respective expression data for the impacted subsystem. Modeling program 112 updates the measurement expressions of the impacted subsystems if the analysis determines that the change will impact one or more subsystems (process 306). For example, if modeling program 112 detects that a new pipe connected to one or more pipes inside a subsystem is added, modeling program 112 determines that the change will impact the subsystem. Then, modeling program 112 updates the measurement expression of the impacted subsystem.

As an example, a change is made to topology data 114 in which a new pipe is added to the pipe network. Upon retrieving updated topology data 114, modeling program 112 detects a change to the model of the pipe network. Then, modeling program 112 determines whether the change impacts one or more subsystems of the pipe network. Modeling program 112 analyzes the diagram of the pipe network. If it is detected that the newly added pipe connects to a pipe inside a subsystem, modeling program 112 determines that change will impact the given subsystem. For example, a newly added pipe connects to a pipe inside a subsystem usually comprises one of two different kinds of scenarios. One scenario is that a pipe is added from outside to inside the subsystem or vice versa, which usually means a new input/output pipe is connected. As such, the direction of the change is further identified and measurement expression is further updated based on the direction of the change. For example, if it is identified that the direction of the change is an input to the subsystem, the measurement expression of system input volume, as consequently the leakage of the subsystem, is updated by adding the measurement of the metering equipment of the new added input pipe. Similarly, if it is identified that the direction of the change is an output of the subsystem, the measurement expressions of the system input volume, consequently the leakage of the subsystem, should be updated by subtracting the measurement of the metering equipment of the new added output pipe. Another scenario is that a pipe is added inside a subsystem, which usually means a new end user pipe is connected. Then the measurement expression of leakage should be updated by subtracting the measurement of the metering equipment of the new added user pipe.

Figure 5:
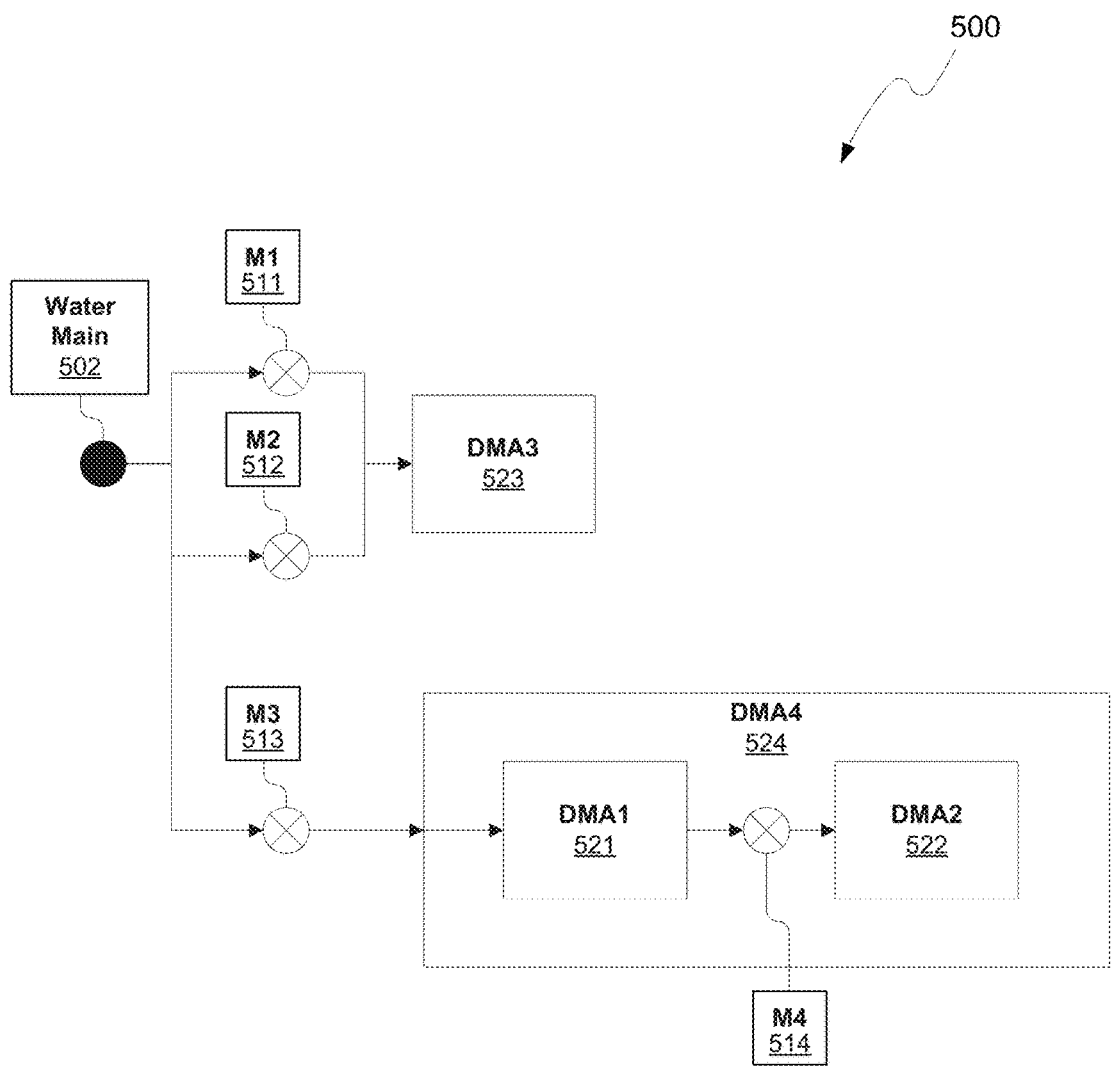
FIG. 5 illustrates an example visual presentation of a pipe system and subsystems.

According to an embodiment of the disclosure, modeling program 112 generates a visual representation of the pipe system and comprising subsystems, wherein the boundaries of the subsystems are the cutting point metering equipments represented by the parameters in expressions data 116. Hence, the boundaries of a subsystem in the visual representation are also updated with the metering equipment and associated newly added pipe(s). In addition to the topographical graphical representations of a pipe system and corresponding subsystems, some embodiments of modeling program 112 generate a logical graphical representations of the pipe system. FIG. 5 illustrates a logical representation, 500, of the example pipe system discussed with FIG. 4. Water main 502 represents a source of a water resource. Logical representation 500 includes cutting point metering equipments $M_1$ 511, $M_2$ 512, $M_3$ 513 and $M_4$ 514 represented as junction points. Logical representation 500 includes DMA1 521, DMA2 522, DMA3 523 and DMA4 524 represent as boxes where subsystems of a given system reside within the parent system (e.g., DMA1 521 and DMA2 522 are grouped in the box for DMA4 524). The direction of arrows stands for the direction of the flow of the pipe network and the connection between subsystems. It should be noted that FIG. 5 is only an example logical representation of subsystems, other possible visual presentations could also be used.

Figure 6:
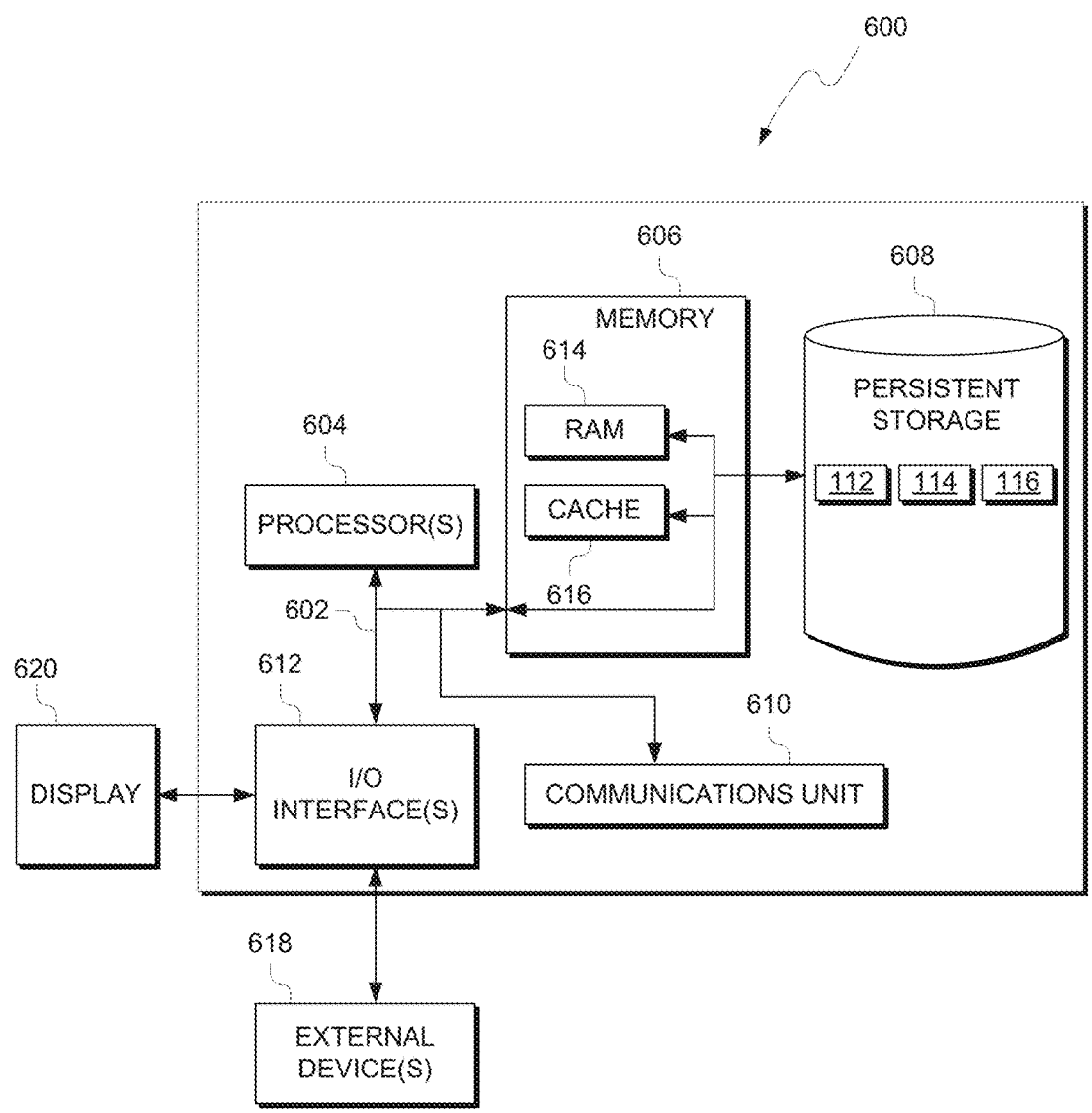
FIG. 6 depicts a block diagram of components of the computing device executing a modeling program, in accordance with an exemplary embodiment of the present invention.

FIG. 6 depicts a block diagram, 600, of components of computing device 110, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 110 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Modeling program 112, topology data 114, and expression data 116 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 120. In these examples, communications unit 610 includes one or more network interface cards. Communications unit 610 may provide communications through the use of either or both physical and wireless communications links. Modeling program 112, topology data 114, and expression data 116 may be downloaded to persistent storage 608 through communications unit 610.

I/O interface(s) 612 allows for input and output of data with other devices that may be connected to computing device 110. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., modeling program 112, topology data 114, and expression data 116, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A computer program product, the computer program product comprising:
one or more computer-readable storage media and program instructions stored on the one or more computer-readable storage media, the program instructions comprising:
program instructions to retrieve a topology model of a pipe network;
program instructions to retrieve a measurement from a first boundary sensor of the pipe network;
program instructions to retrieve a measurement from a second boundary sensor of the pipe network;
in response to the measurements of the first and second boundary sensors matching flow amounts of a resource, program instructions to combine the first and second boundary sensors as a representation of a cutting point measurement device in the topology model of the pipe network;
program instructions to retrieve one or more measurement expressions of the pipe network;
program instructions to determine a parameter list for a first measurement expression, wherein a first parameter of the parameter list represents a cutting point measurement device;
program instructions to generate a first subsystem of the pipe network based, at least in part on, the first parameter; and
program instructions to generate a visual representation of a boundary of the first subsystem, based, at least in part, on a location of the cutting point measurement device.

2. The computer program product of claim 1, wherein a second parameter of the parameter list represents an ending point measurement device.

3. The computer program product of claim 1, the program instructions further comprising:
responsive to a determination that a change in the topology model of the pipe network impacts a second subsystem of the pipe network, program instructions to update a second measurement expression of the second subsystem, wherein the second measurement expression includes one or more parameters describing the second subsystem of the pipe network.

4. The computer program product of claim 3, the program instructions further comprising:
program instructions to update the second measurement expression based, at least in part, on a change in direction to at least one flow measurement of the second subsystem of the pipe network.

5. The computer program product of claim 3, the program instructions further comprising:
program instructions to update the first measurement expression and the second measurement expression based, at least in part, on the change in the topology model of the pipe network includes a new connection to the first subsystem and the second subsystem.

6. The computer program product of claim 5, wherein a new parameter is added to the parameter list representing the new connection.

7. A computer system, the computer system comprising:
one or more computer processors;
one or more computer readable storage media; and
program instructions stored on the one or more computer readable storage media for execution by at least one of the one or more processors, the program instructions comprising:
program instructions to retrieve a topology model of a pipe network;
program instructions to retrieve a measurement from a first boundary sensor of the pipe network;
program instructions to retrieve a measurement from a second boundary sensor of the pipe network;
in response to the measurements of the first and second boundary sensors matching flow amounts of a resource, program instructions to combine the first and second boundary sensors as a representation of a cutting point measurement device in the topology model of the pipe network;
program instructions to retrieve one or more measurement expressions of the pipe network;
program instructions to determine a parameter list for a first measurement expression, wherein a first parameter of the parameter list represents a cutting point measurement device;
program instructions to generate a first subsystem of the pipe network based, at least in part on, the first parameter; and
program instructions to generate a visual representation of a boundary of the first subsystem, based, at least in part, on a location of the cutting point measurement device.

8. The computer system of claim 7, wherein a second parameter of the parameter list represents an ending point measurement device.

9. The computer system of claim 7, the program instructions further comprising:
responsive to a determination that a change in the topology model of the pipe network impacts a second subsystem of the pipe network, program instructions to update a second measurement expression of the second subsystem, wherein the second measurement expression includes one or more parameters describing the second subsystem of the pipe network.

10. The computer system of claim 9, the program instructions further comprising:
program instructions to update the second measurement expression based, at least in part, on a change in direction to at least one flow measurement of the second subsystem of the pipe network.

11. The computer system of claim 9, the program instructions further comprising:
program instructions to update the first measurement expression and the second measurement expression based, at least in part, on the change in the topology model of the pipe network includes a new connection to the first subsystem and the second subsystem.

12. The computer system of claim 11, wherein a new parameter is added to the parameter list representing the new connection.

* * * * *